(12) United States Patent
Watanabe et al.

(10) Patent No.: US 8,771,142 B2
(45) Date of Patent: Jul. 8, 2014

(54) CONTROLLER OF VEHICLE AND CONTROL METHOD OF VEHICLE

(75) Inventors: Shinichiro Watanabe, Yokohama (JP); Keichi Tatewaki, Atsugi (JP); Naohiro Yamada, Atsugi (JP); Hideshi Wakayama, Hadano (JP)

(73) Assignee: Jatco Ltd, Fuji-shi (JP)

( * ) Notice: Subject to any disclaimer, the term of this patent is extended or adjusted under 35 U.S.C. 154(b) by 406 days.

(21) Appl. No.: 13/305,187

(22) Filed: Nov. 28, 2011

(65) Prior Publication Data
US 2012/0135839 A1 May 31, 2012

(30) Foreign Application Priority Data

Nov. 30, 2010 (JP) .................................. 2010-266830

(51) Int. Cl.
*F16H 61/48* (2006.01)

(52) U.S. Cl.
USPC ............................................................ 477/54

(58) Field of Classification Search
USPC ........................................................ 701/112
See application file for complete search history.

(56) References Cited

U.S. PATENT DOCUMENTS

| | | | |
|---|---|---|---|
| 5,928,111 A * | 7/1999 | Sakakibara et al. .......... | 477/181 |
| 6,251,046 B1 * | 6/2001 | Yoshino et al. ............... | 477/187 |
| 6,494,809 B1 | 12/2002 | Suzuki et al. | |
| 7,680,568 B2 * | 3/2010 | Moran ........................... | 701/22 |
| 7,789,796 B2 | 9/2010 | Choi | |
| 8,620,567 B2 * | 12/2013 | Lewis et al. ................... | 701/112 |
| 2009/0017985 A1 | 1/2009 | Choi | |
| 2010/0184562 A1 | 7/2010 | Senda et al. | |
| 2011/0053735 A1* | 3/2011 | Lewis et al. ..................... | 477/99 |
| 2012/0059571 A1* | 3/2012 | Yamada et al. ............... | 701/112 |
| 2012/0184405 A1* | 7/2012 | Morimura et al. ............. | 477/54 |

FOREIGN PATENT DOCUMENTS

| | | |
|---|---|---|
| EP | 1 186 494 A2 | 3/2002 |
| JP | 2002-371876 A | 12/2002 |
| JP | 2009-018786 A | 1/2009 |
| JP | 2010-164143 A | 7/2010 |
| JP | 2010-196828 A | 9/2010 |

* cited by examiner

*Primary Examiner* — Dirk Wright (74) *Attorney, Agent, or Firm* — Foley & Lardner LLP (57) ABSTRACT

A controller of a vehicle, provided with a coast stop control unit which automatically stops an engine during the travel of a vehicle if coast stop conditions are met during the travel of the vehicle, and the coast stop control unit automatically stops the engine at least if a change amount of acceleration of the vehicle caused by the automatic stop of the engine is predetermined acceleration or less.

12 Claims, 7 Drawing Sheets

CONTROLLER OF VEHICLE AND CONTROL METHOD OF VEHICLE

TECHNICAL FIELD OF THE INVENTION

The present invention relates to a controller of a coast stop vehicle which can automatically stop an engine during running and a control method of a vehicle.

BACK GROUND OF THE INVENTION

An idle-stop vehicle which automatically stops an engine if a predetermined automatic stop condition is met during stop and restarts the engine if a re-start condition is met is known.

Moreover, in order to improve fuel consumption by enlarging a stop region of the engine, JP2010-164143A, for example, describes coast stop control in which fuel supply to the engine is stopped so as to automatically stop the engine during deceleration at a low speed which likely results in vehicle stop even during the travel of the vehicle.

SUMMARY OF THE INVENTION

However, if the coast stop conditions are met and the engine is automatically stopped during running, torque transmitted from the engine to driving wheels is rapidly lowered, and a shock might occur.

Here, during vehicle deceleration, a vehicle speed is lowered in a driven state in which the engine is co-rotated with rotation of the driving wheels and if the engine rotation is lowered to a substantially idle rotation, the state changes to a drive state in which a driving force is transmitted from the engine to the driving wheels.

If the coast stop conditions are met when the vehicle is in the driven state, the deceleration of the vehicle is increased by automatically stopping the engine, and thus, it is likely that a shock is caused by a step in the driving force. Also, if the engine is automatically stopped when the coast stop conditions are met while the vehicle is in the drive state, acceleration of the vehicle changes from positive to negative, and it is likely that a larger shock occurs.

The present invention was made in view of the above technical problems and has an object to prevent occurrence of a shock caused by coast stop control.

One aspect of the present invention is a controller of a vehicle, provided with a coast stop control unit which automatically stops an engine during the travel of a vehicle if the coast stop conditions are met during the travel of the vehicle, and the coast stop control unit automatically stops an engine at least if a change amount of acceleration of the vehicle produced by the automatic stop of the engine is predetermined acceleration or less.

Also, another aspect of the present invention is a control method of a vehicle. The control method provided with automatically stopping the engine during the travel of the vehicle if the coast stop conditions are met during the travel of the vehicle. The engine is automatically stopped if a change amount of acceleration of the vehicle produced by the automatic stop of the engine is at least predetermined acceleration or less.

According to these aspects, if the change amount of the acceleration of the vehicle is larger than the predetermined acceleration, the automatic stop of the engine is not executed by the coast stop control, and occurrence of a shock caused by execution of the coast stop control can be prevented, and thus, a driver can be prevented from feeling the shock.

DESCRIPTION OF PREFERRED EMBODIMENT

An embodiment of the present invention will be described below by referring to the attached drawings. Note that, in the following explanation, a "speed ratio" of a transmission mechanism is a value obtained by dividing an input rotation speed of the transmission mechanism by an output rotation speed of the transmission mechanism. Also, a "lowest speed ratio" is the maximum speed ratio of the transmission mechanism and a "highest speed ratio" is the minimum speed ratio of the transmission mechanism.

Figure 1:
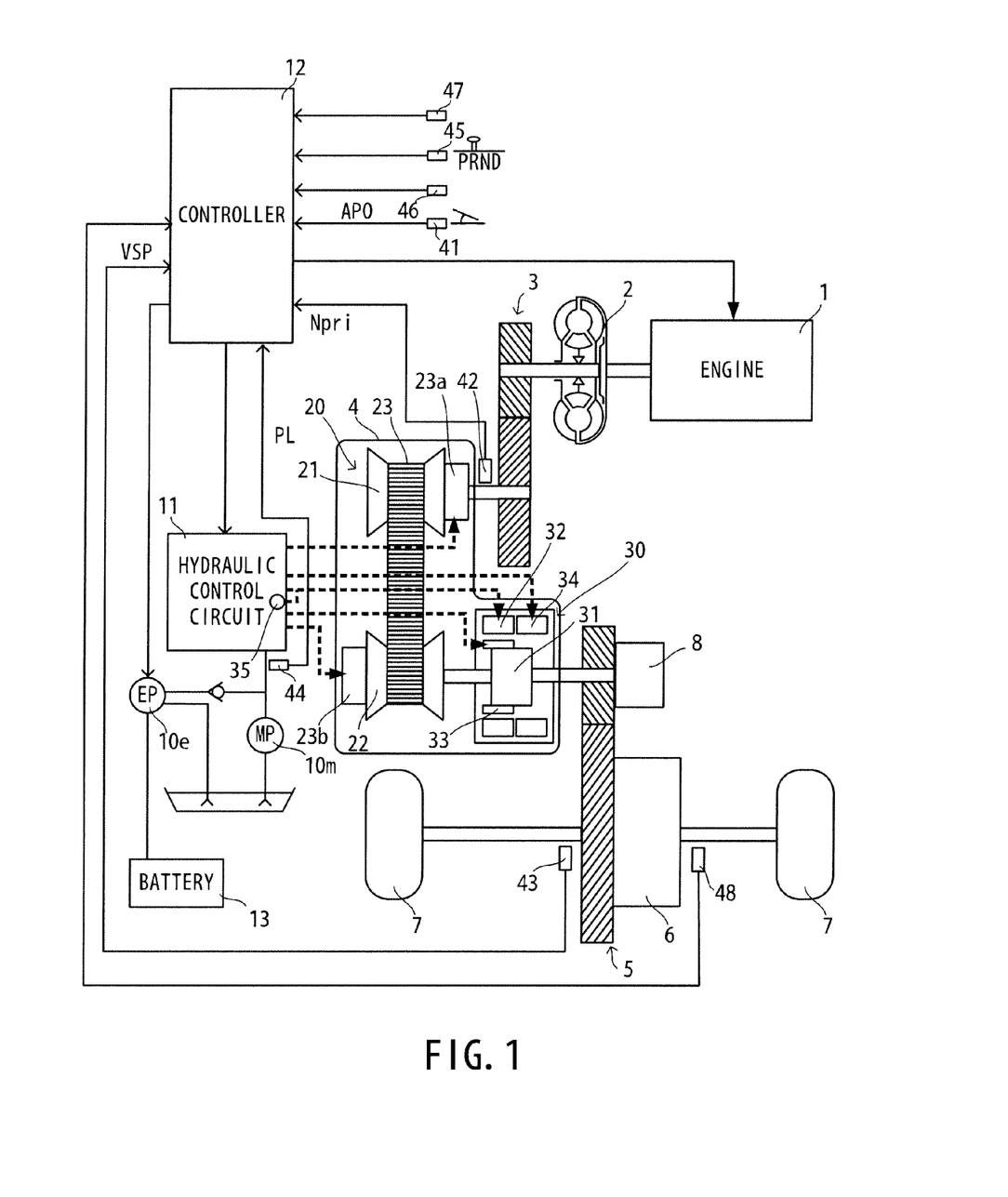
FIG. 1 is a schematic construction diagram of a coast stop vehicle according to an embodiment of the present invention.

FIG. 1 is a schematic construction diagram of a coast stop vehicle according to the embodiment of the present invention. This vehicle includes an engine 1 as a driving source, and output rotation of the engine 1 is transmitted to driving wheels 7 through a torque converter 2 with a lock-up clutch, a first gear train 3, a continuously variable transmission (hereinafter simply referred to as a "transmission 4"), a second gear train 5, and a final speed reducer 6. The second gear train 5 includes a parking mechanism 8 which mechanically lock an output shaft of the transmission 4 in a parked state so as not to be able to rotate.

The transmission 4 is provided with a mechanical oil pump 10m to which the rotation of the engine 1 is inputted and which is driven by using a part of power of the engine 1 and an electrical oil pump 10e which is driven upon receiving power supply from a battery 13. The electrical oil pump 10e is formed of an oil pump main body, and an electric motor and a motor driver for driving and rotating the oil pump main body and can control a driving load to a desired load or in multiple stages. Further, the transmission 4 includes a hydraulic control circuit 11 which adjusts a hydraulic pressure (hereinafter referred to as a "line pressure PL") from the mechanical oil pump 10m or the electrical oil pump 10e and supplies it to each portion of the transmission 4.

The transmission 4 includes a V-belt continuously variable transmission mechanism (hereinafter referred to as a "variator 20") and a sub-transmission mechanism 30 disposed in series with the variator 20. The phrase "to be disposed in series" means that the variator 20 and the sub-transmission mechanism 30 are disposed in series in a power transmission path from the engine 1 to the driving wheels 7. The sub-transmission mechanism 30 may be directly connected in series with the output shaft of the variator 20 or may be connected through another transmission or power transmission mechanism (a gear train, for example). Alternatively, the sub-transmission mechanism 30 may be connected to a front side (input shaft side) of the variator 20.

The variator 20 is provided with a primary pulley 21, a secondary pulley 22, and a V-belt 23 mounted between the pulleys 21 and 22. Each of the pulleys 21 and 22 includes a fixed conical plate, a movable conical plate which is arranged with a sheave surface opposed to this fixed conical plate and forms a V-groove with the fixed conical plate, and hydraulic cylinders 23a and 23b which are disposed on the back face of the movable conical plate and displace the movable conical plate in the axial direction. By adjusting a hydraulic pressure supplied to the hydraulic cylinders 23a and 23b, the width of the V-groove is changed, a contact radius between the V-belt 23 and each of the pulleys 21 and 22 is changed, and a speed ratio of the variator 20 is continuously varied.

The sub-transmission mechanism 30 is a transmission mechanism having two forward speeds and one reverse speed. The sub-transmission mechanism 30 includes a Ravigneaux-type planetary gear mechanism 31 in which carriers of two planetary gears are coupled, and a plurality of frictional engagement elements (a low brake 32, a high clutch 33, and a reverse brake 34) connected to a plurality of rotation elements constituting the Ravigneaux-type planetary gear mechanism 31 and changing the connection state thereof. If hydraulic pressure supplied to each of the frictional engagement elements 32 to 34 is adjusted to change an engagement/release state of each of the frictional engagement elements 32 to 34, the gear position of the sub-transmission mechanism 30 is changed.

For example, the sub-transmission mechanism 30 is set to a first gear position if the low brake 32 is engaged and the high clutch 33 and the reverse brake 34 are released. The sub-transmission mechanism 30 is set to a second gear position with a gear ratio lower than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or behind the variator 20 on the power transmission path, and any of them enables power transmission of the transmission 4 when being engaged while disabling power transmission of the transmission 4 when being released.

Further, an accumulator 35 is connected at an intermediate position of an oil path for supplying the hydraulic pressure to the low brake 32. The accumulator 35 delays the supply and discharge of the hydraulic pressure to and from the low brake 32, suppresses a sudden increase in the hydraulic pressure supplied to the low brake 32 by accumulating the hydraulic pressure at the time of selecting an N-D shift and prevents the occurrence of a shock due to sudden engagement of the low brake 32.

Figure 2:
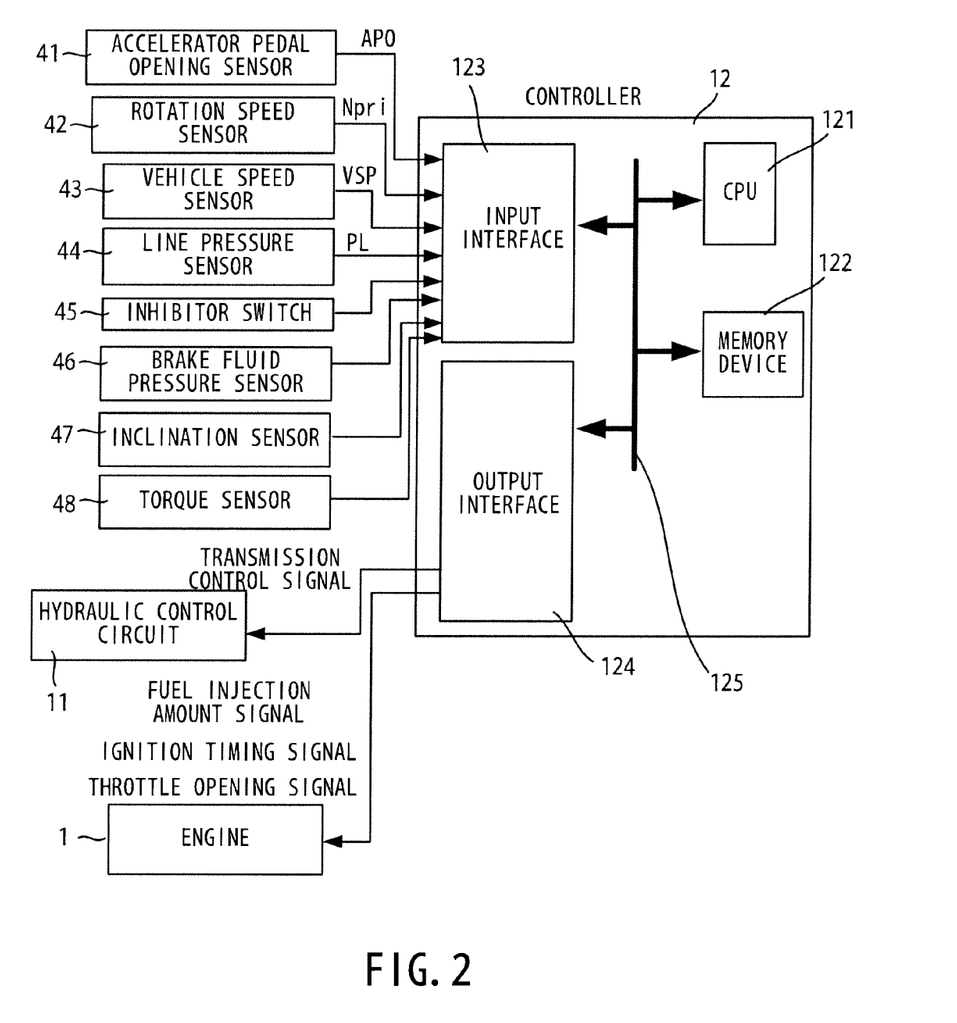
FIG. 2 is a diagram illustrating an internal configuration of a controller.

A controller 12 is a controller which comprehensively controls the engine 1 and the transmission 4 and is formed of, as illustrated in FIG. 2, a CPU 121, a storage device 122 made of a RAM and a ROM, an input interface 123, an output interface 124, and a bus 125 connecting them to each other.

Into the input interface 123, an output signal of an accelerator pedal opening sensor 41 which detects an accelerator pedal opening APO, which is an operation amount of an accelerator pedal, an output signal of a rotation speed sensor 42 which detects an input rotation speed of the transmission 4 (=rotation speed of the primary pulley 21, and hereinafter referred to as a "primary rotation speed Npri"), an output signal of a vehicle speed sensor 43 which detects a vehicle speed VSP, an output signal of a line pressure sensor 44 which detects the line pressure PL, an output signal of an inhibitor switch 45 which detects a position of a select lever, a brake fluid pressure sensor 46 which detects a brake fluid pressure, an output signal of an inclination sensor 47 which detects inclination of the car body (≈road gradient), an output signal of a torque sensor 48 which detects torque to be transmitted to the driving wheels 7 and the like are inputted.

In the storage device 122, a control program of the engine 1, a transmission control program of the transmission 4, various maps/tables used in these programs are stored. The CPU 121 reads out and implements the programs stored in the storage device 122, performs various types of calculation processing on the various signals inputted through the input interface 123, generates a fuel injection amount signal, an ignition timing signal, a throttle opening signal, a transmission control signal, and a drive signal of the electrical oil pump 10e, and outputs the generated signals to the engine 1, the hydraulic control circuit 11, the motor driver of the electrical oil pump 10e through an output interface 124. Various values used by the CPU 121 in the calculation processing and the calculation results are stored in the storage device 122 as appropriate.

The hydraulic control circuit 11 is constituted by a plurality of flow passages and a plurality of hydraulic control valves. The hydraulic control circuit 11 controls the plurality of hydraulic control valves so as to switch supply paths of the hydraulic pressures and prepares a required hydraulic pressure from the hydraulic pressure produced in the mechanical oil pump 10m or the electrical oil pump 10e on the basis of the transmission control signal from the controller 12 and supplies it to each portion of the transmission 4. As a result, the speed ratio of the variator 20 and the gear position of the sub-transmission mechanism 30 are changed, and the transmission 4 is shifted.

Figure 3:
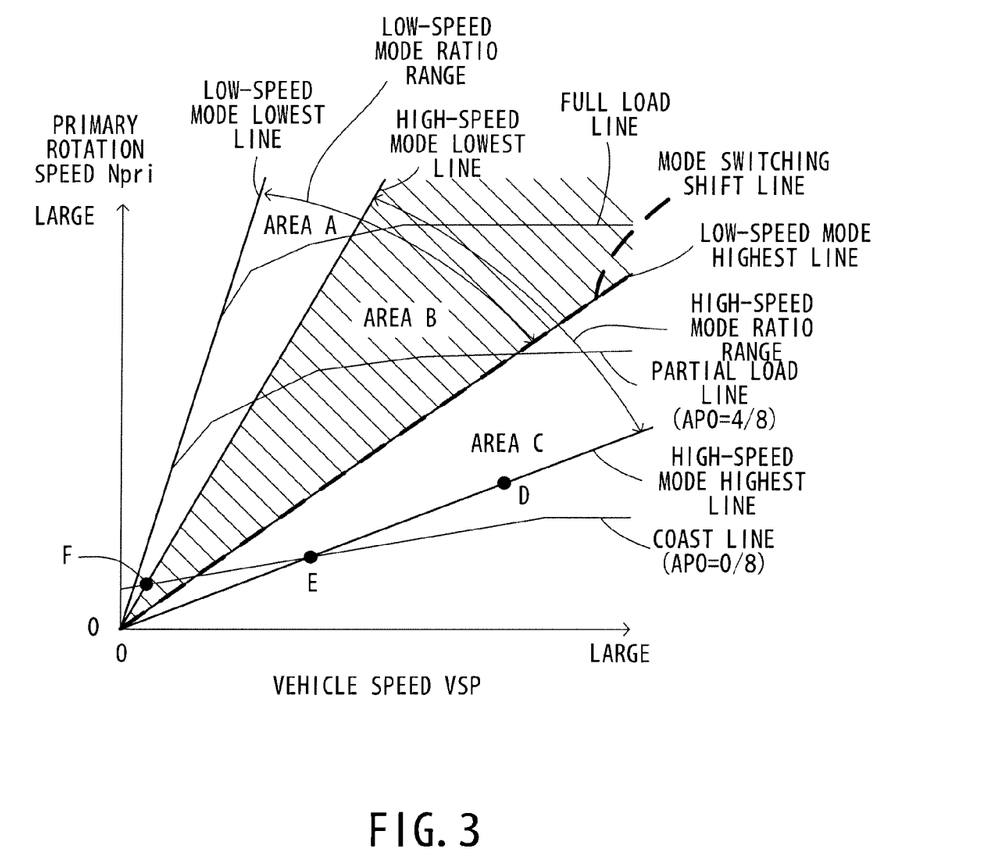
FIG. 3 is a diagram illustrating an example of a shift map.

FIG. 3 illustrates an example of a shift map stored in the storage device 122. The controller 12 controls the variator 20 and the sub-transmission mechanism 30 on the basis of this shift map in accordance with the operation state of the vehicle (in this embodiment, the vehicle speed VSP, the primary rotation speed Npri, and the accelerator pedal opening APO).

In this shift map, an operating point of the transmission 4 is defined by the vehicle speed VSP and the primary rotation speed Npri. The inclination of the line connecting the operating point of the transmission 4 and the zero point at the lower left corner of the shift map corresponds to the speed ratio of the transmission 4 (overall speed ratio obtained by multiplying the speed ratio of the variator 20 by the speed ratio of the sub-transmission mechanism 30, and hereinafter referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. Note that, for simplicity, only a full load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

If the transmission 4 is in a low-speed mode, the transmission 4 can be shifted between the low-speed mode lowest line obtained by setting the speed ratio of the variator 20 to the lowest speed ratio and the low-speed mode highest line obtained by setting the speed ratio of the variator 20 to the highest speed ratio. In this case, the operating point of the transmission 4 moves within an A region and a B region. On the other hand, if the transmission 4 is in the high-speed mode, the transmission 4 can be shifted between the high-speed mode lowest line obtained by setting the speed ratio of the variator 20 to the lowest speed ratio and the high-speed mode highest line obtained by setting the speed ratio of the variator 20 to the highest speed ratio. In this case, the operating point of the transmission 4 moves within the B region and a C region.

The speed ratio of each gear position of the sub-transmission mechanism 30 is set such that the speed ratio corresponding to the low-speed mode highest line (low-speed mode highest speed ratio) is smaller than the speed ratio corresponding to the high-speed mode lowest line (high-speed mode lowest speed ratio). As a result, the range of the through speed ratio of the transmission 4 that can be set in the low-speed mode ("low-speed mode ratio range" in the figure) and the range of the through speed ratio of the transmission 4 that can be set in the high speed mode ("high-speed mode ratio range" in the figure) are partially overlapped, and if the operating point of the transmission 4 is in the B region sandwiched between the high-speed mode lowest line and the low-speed mode highest line, the transmission 4 can select either of the low-speed mode and the high-speed mode.

Further, on the shift map, a mode switching shift line at which the sub-transmission mechanism 30 is shifted is so set as to overlap the low-speed mode highest line. The through speed ratio corresponding to the mode switching shift line (hereinafter referred to as a "mode switching speed ratio mRatio") is set at a value equal to the low-speed mode highest speed ratio. The mode switching shift line is set as above because the smaller the speed ratio of the variator 20 is, the smaller the input torque into the sub-transmission mechanism 30 becomes, and a shift shock when the sub-transmission mechanism 30 is shifted can be suppressed.

When the operating point of the transmission 4 crosses the mode switching shift line, that is, when the actual value of the through speed ratio (hereinafter referred to as an "actual through speed ratio Ratio") changes over the mode switching speed ratio mRatio, the controller 12 performs synchronization shift, which will be described below, and switching between the high-speed mode and the low-speed mode.

In the synchronization shift, the controller 12 shifts gear of the sub-transmission mechanism 30 and changes the speed ratio of the variator 20 in a direction opposite to the direction in which the speed ratio of the sub-transmission mechanism 30 changes. At this time, an inertia phase in which the speed ratio of the sub-transmission mechanism 30 actually changes is synchronized with a period during which the speed ratio of the variator 20 is changed. The speed ratio of the variator 20 is changed in the direction opposite to the direction of the speed ratio change of the sub-transmission mechanism 30 so that the change in the input rotation caused by a difference in the actual through speed ratio Ratio does not give a sense of discomfort to the driver.

Specifically, if the actual through speed ratio Ratio of the transmission 4 changes over the mode switching speed ratio mRatio from the Low side to the High side, the controller 12 changes the gear position of the sub-transmission mechanism 30 from the first speed to the second speed (1-2 shift) and also changes the speed ratio of the variator 20 to the Low side.

On the contrary, if the actual through speed ratio Ratio of the transmission 4 changes over the mode switching speed ratio mRatio from the High side to the Low side, the controller 12 changes the gear position of the sub-transmission mechanism 30 from the second speed to the first speed (2-1 shift) and changes the speed ratio of the variator 20 to the High side.

Here, if the transmission 4 is in the high-speed mode and the vehicle is in the coast state in which the vehicle is decelerating by accelerator-off and brake-on, by means of this synchronization shift, the speed ratio of the variator 20 changes to the High side once when the sub-transmission mechanism 30 performs the 2-1 shift, and thus, the change of the speed ratio of the variator 20 to the lowest speed ratio requires time, and it is likely that the vehicle stops before the speed ratio of the variator 20 changes to the lowest speed ratio.

Thus, in the case of vehicle stop in the coast state in the high-speed mode, the controller 12 changes the gear position of the sub-transmission mechanism 30 from the second speed to the first speed (2-1 shift) after the vehicle stops without performing the above-described synchronization shift.

Also, the controller 12 executes coast stop control, which will be described later, in order to suppress a fuel consumption amount.

The coast stop control is control in which the fuel consumption amount is suppressed by automatically stopping (coast stop) the engine 1 while the vehicle is running in a low vehicle speed region. This control is common to fuel cut control executed during accelerator is off in a point that fuel supply to the engine 1 is stopped but different in a point that a lock-up clutch and the low brake 32 are disengaged so as to cut off the power transmission path between the engine 1 and the driving wheels 7 and to fully stop the rotation of the engine 1.

Upon executing the coast stop control, the controller 12 first makes judgment on, for example, conditions a to d described below. These conditions are, in other words, conditions for determining whether the driver has an intention to stop the vehicle or not.

a: accelerator pedal is not depressed at all (accelerator pedal opening APO=0).

b: brake pedal is depressed (brake fluid pressure is at a predetermined value or more).

c: vehicle speed is a predetermined low vehicle speed (9 km/h, for example) or less.

d: lock-up clutch is released.

The lock-up clutch is disengaged if a lock-up disengagement line (not shown) set on the shift map is crossed from the high-speed side or high-rotation side to the low-speed side or low-rotation side. The controller 12 determines that the coast stop conditions are met if these conditions a to d and the like are all met.

If the coast stop conditions are met, then, the controller 12 lowers a hydraulic pressure instructed to the low brake 32 to zero and drains the hydraulic pressure accumulated in the accumulator 35. In view of the decrease of the supply hydraulic pressure to the low brake 32, meeting the coast stop conditions is also meeting the condition for lowering the supply hydraulic pressure to the low brake 32 (hydraulic-pressure lowering condition). Then, if the hydraulic pressure accumulated in the accumulator 35 has been fully drained, the controller 12 executes the coast stop control.

If the coast stop control is executed, fuel supply to the engine 1 is stopped, and the engine 1 is automatically stopped. If the engine 1 is stopped, the mechanical oil pump 10*m* driven by the power of the engine 1 is also stopped, the discharge pressure thereof falls to zero, and the low brake 32 is fully disengaged. As described above, since the hydraulic pressure accumulated in the accumulator 35 has been fully drained in advance, the low brake 32 is disengaged substantially at the same time as stop of the engine 1 and the mechanical oil pump 10*m*.

If the supply hydraulic pressure from the mechanical oil pump 10*m* to hydraulic cylinders 23*a* and 23*b* of the pulleys 21 and 22 falls to zero and also, the low brake 32 is disengaged and the variator 20 is made free in the rotating direction, the speed ratio of the variator 20 is changed toward the lowest speed ratio by means of a return spring arranged in the hydraulic cylinders 23a and 23b.

If the mechanical oil pump 10m is stopped, driving of the electrical oil pump 10e is started, and the hydraulic pressure produced in the electrical oil pump 10e is supplied to the hydraulic cylinders 23a and 23b and changes the variator 20 to the lowest speed ratio.

The hydraulic pressure supplied to the hydraulic cylinders 23a and 23b is a hydraulic pressure only to sandwich the belt 23 by the pulleys 21 and 22 and is not sufficient to transmit the power. However, since the low brake 32 has been disengaged and the sub-transmission mechanism 30 has been brought into a neutral state, even if a torque is inputted from the driving wheels 7 due to braking or the like, this torque is not transmitted to the variator 20 through the sub-transmission mechanism 30, and slippage of the belt 23 is prevented.

Also, after the low brake 32 is disengaged, the controller 12 raises the supply hydraulic pressure to the low brake 32 to a hydraulic pressure at which a gap between the input-side element and the output-side element is zero and a torque capacity of the low brake 32 (transmittable torque) becomes zero (hereinafter referred to as a "zero-point hydraulic pressure".). This is performed so that during the coast stop control, by maintaining the low brake 32 in the state immediately before engagement, the torque capacity of the low brake 32 is rapidly raised during re-acceleration and re-acceleration responsiveness is improved.

If the engine 1 is re-started, the rotation speed of the engine 1 is raced once and then, is settled to a steady rotation. The controller 12 maintains the hydraulic pressure supplied to the low brake 32 at zero-point hydraulic pressure till racing of the engine 1 is converged so that the rotation during racing is not transmitted to the driving wheels 7 through the low brake 32.

The judgment on whether the conditions a to d above are met or not is continuously made even during the coast stop control. If any one of the conditions is not met, the coast stop conditions are not met, and the controller 12 resumes the fuel supply to the engine 1 and re-starts the engine 1 and also stops the electrical oil pump 10e when the mechanical oil pump 10m begins to produce a sufficient hydraulic pressure.

Here, if the coast stop control is executed, the engine 1 is stopped, and the engine torque is rapidly lowered. As a result, if torque fluctuation is large, acceleration of the vehicle is largely changed, and a driver might feel a shock.

The case in which the vehicle acceleration is largely changed by execution of the coast stop control will be described. As illustrated in FIG. 3, if the transmission 4 is running in the high-speed mode and the operating point is in the C region, the primary rotation speed is lowered by accelerator-off and brake-on, and the operating point becomes a point D on the high-speed highest line. After that, with decrease of the vehicle speed, the operating point moves along the high-speed mode highest line and after the point reaches a point E, the point moves along the coast line.

As described above, since the synchronization shift is not executed during coasting from the high-speed mode, even if the operating point crosses the mode switching shift line, the gear position of the sub-transmission mechanism 30 remains at the second speed. If the vehicle speed is further lowered and the operating point reaches a point F on the high-speed mode lowest line, the vehicle speed is lowered along the high-speed mode lowest line and then, the vehicle is stopped.

Figure 4:
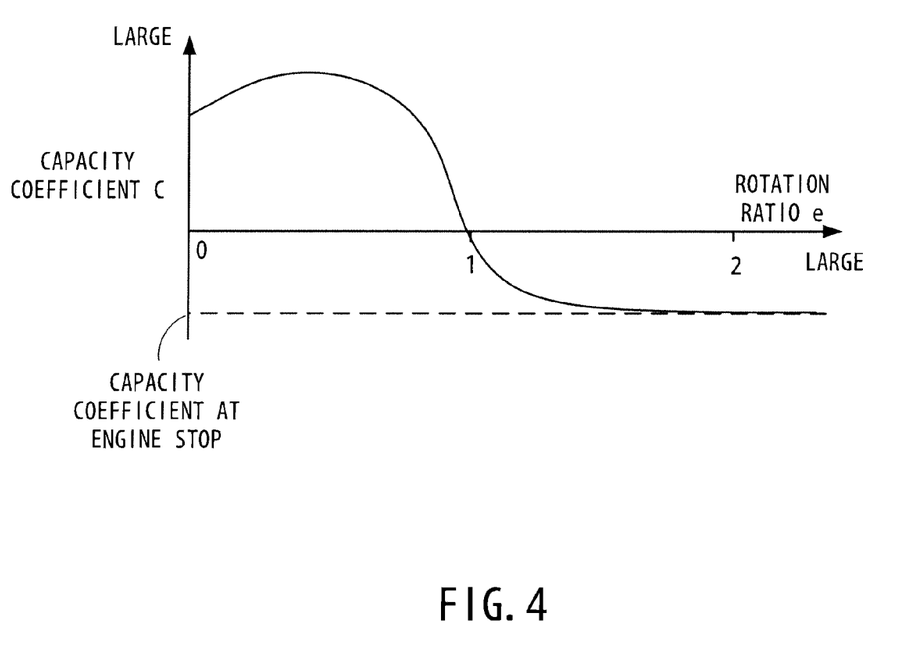
FIG. 4 is a diagram illustrating a relationship between a capacity coefficient and a rotation ratio.

Here, a relationship between a capacity coefficient C of the torque converter and a rotation ratio e of the torque converter is illustrated in FIG. 4. In the case of the rotation ratio e<1, the torque transmission state is positive (a state in which the toque is transmitted from the engine 1 to the driving wheels 7), while in the case of the rotation ratio e>1, the torque transmission state is negative (a state in which the torque is transmitted from the driving wheels 7 to the engine 1).

If the operating point moves from the point E to the point F and then, moves from the point F to "0" in FIG. 3, the rotation ratio e in FIG. 4 moves from "e>1" to "e=1" and then, moves from "e=1" to "e<1". In this case, the capacity coefficient C changes from a negative value to zero and then, changes to a positive value (draws a trajectory like a quadric curve). That is, with decrease of the vehicle speed from the point E, the capacity coefficient C increases while drawing a trajectory like a quadric curve.

If the coast stop control is executed, the engine rotation becomes zero, and the capacity coefficient C becomes a capacity coefficient at engine stop, which is a negative value, as illustrated in FIG. 4. At this time, the farther the capacity coefficient C before execution of the coast stop control is away from the capacity coefficient at engine stop, the larger the deviation (shock) of the capacity coefficient C at execution of the coast stop control becomes. If the deviation of the capacity coefficient C is large, a change amount of acceleration of the vehicles increases, which is felt as a large shock by the driver.

Figure 5:
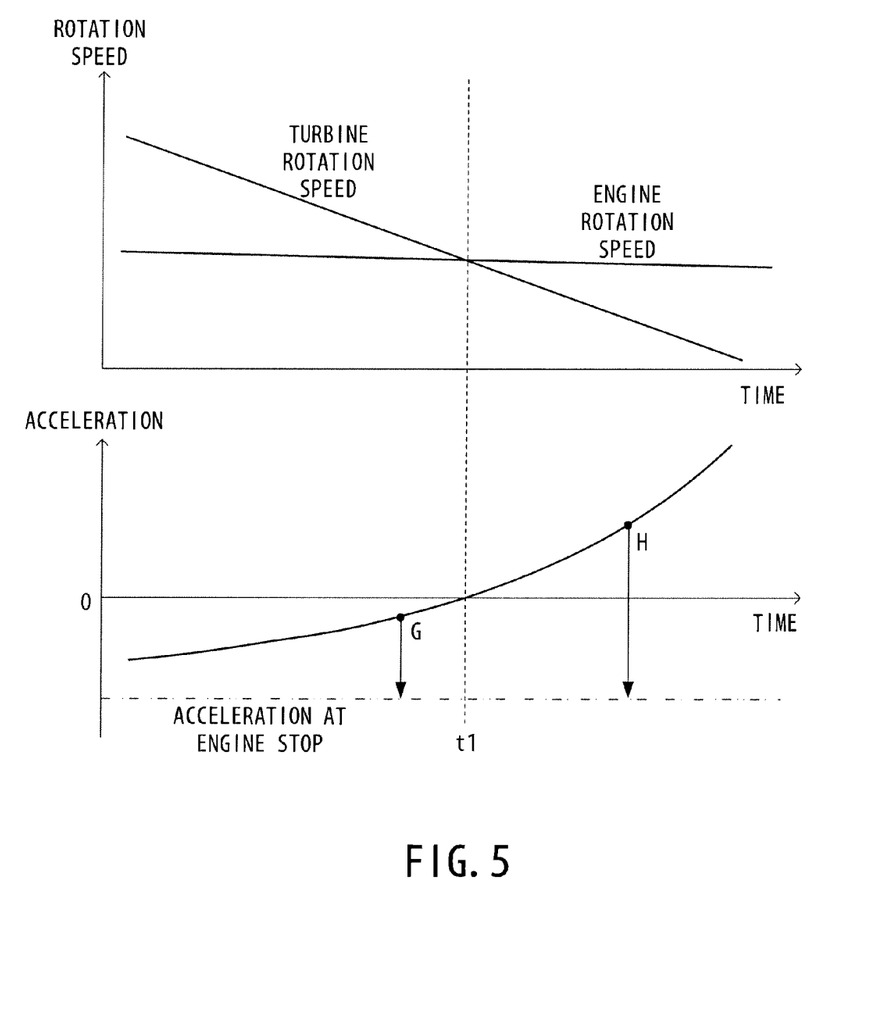
FIG. 5 is a time chart illustrating changes of a turbine rotation speed, an engine rotation speed, and acceleration during vehicle deceleration.

The shock when the coast stop control is started will be described below by referring to FIG. 5 illustrating the capacity coefficient as acceleration in a simplified manner.

FIG. 5 is a time chart illustrating changes of the engine rotation speed, a turbine rotation speed (rotation speed on the output side of the torque converter 2), and acceleration of the vehicle when the operating point moves from the point E to the point F in FIG. 3 and the vehicle is stopped.

The engine rotation speed is a substantially idle rotation speed and does not change, while the turbine rotation speed decreases with decrease of the vehicle speed. At time t1, the turbine rotation speed falls below the engine rotation speed and the turbine rotation speed further decreases and becomes zero with stop of the vehicle. At this time, differential rotation between the engine rotation speed and the turbine rotation speed is absorbed by the torque converter 2.

Also, the acceleration of the vehicle rises in a quadric curve manner and is a negative value (direction to stop the vehicle) before the time t1 when the turbine rotation speed exceeds the engine rotation speed and becomes zero at the time t1 and then, becomes a positive value (direction to accelerate the vehicle). That is, before the time t1, the acceleration is in the driven state in which the driving wheels 7 co-rotate the engine 1, while after the time t1, the acceleration is in the drive state in which a creep force is transmitted from the engine 1 to the driving wheels 7.

If the engine 1 is stopped by the coast stop control during deceleration as above, the acceleration of the vehicle becomes acceleration at engine stop. The acceleration at engine stop is a value corresponding to the acceleration when the capacity coefficient is a capacity coefficient at engine stop in FIG. 4. For example, when the turbine rotation speed is higher than the engine rotation speed and the acceleration of the vehicle is at a point G in FIG. 5, if the coast stop conditions are met and the engine 1 is automatically stopped, negative acceleration decreases (the absolute value increases) and becomes the acceleration at engine stop. However, in this case, since the lowered amount of acceleration of the vehicle is small, shock does not matter.

Also, when the turbine rotation speed is lower than the engine rotation speed and the acceleration of the vehicle is at a point H in FIG. 5, if the coast stop conditions are met and the engine 1 is automatically stopped, the positive acceleration changes to negative acceleration and becomes acceleration at engine stop. In this case, the vehicle is driven by a creep force, and a state in which an acceleration feeling is felt is rapidly changed to a state in which a deceleration feeling is felt, whereby a driver might feel a larger shock.

That is, the acceleration when the operating point moves from the point E to the point F and then, moves from the point F to "0" in FIG. 3 increases with decrease of the vehicle speed (turbine rotation speed), and the acceleration in the increasing tendency changes to a negative value (acceleration at engine stop) opposite to the increasing direction by execution of the coast stop control and thus, the driver feels it as a large shock.

Figure 6:
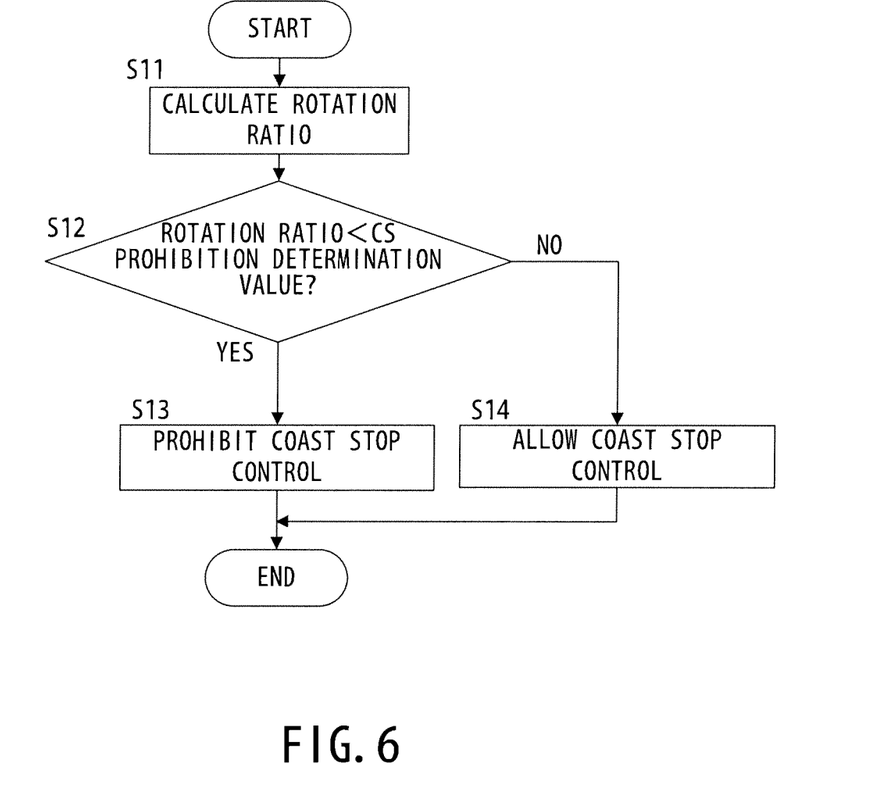
FIG. 6 is a flowchart illustrating a flow of control in this embodiment.

Thus, in this embodiment, in order to prevent occurrence of the above-described shock, the controller 12 executes the following control. FIG. 6 is a flowchart illustrating a flow of the control in this embodiment. This control is repeated in every micro time (10 ms, for example).

At Step S11, the controller 12 calculates a rotation ratio of the torque converter 2. The rotation ratio is calculated on the basis of the following equation:

$$\text{(Rotation ratio)} = \text{(Turbine rotation speed)} / \text{(Engine rotation speed)}$$

At Step S12, the controller 12 determines whether the rotation ratio of the torque converter 2 is lower than a predetermined CS prohibition determination value or not. If the rotation ratio is determined to be lower than the CS prohibition determination value, the processing proceeds to Step S13, while if the rotation ratio is determined to be not less than the CS prohibition determination value, the processing proceeds to Step S14. The CS prohibition determination value is such a value that can be determined to make a driver feel a shock by fluctuation in acceleration if the coast stop control is executed and the value is set in advance. That is, at this Step, it is determined whether the change amount of acceleration of the vehicle is a value which makes the driver feel a shock or not if the engine 1 is automatically stopped by execution of the coast stop control.

At Step S13, the controller 12 prohibits the coast stop control.

At Step S14, the controller 12 allows the coast stop control.

Figure 7:
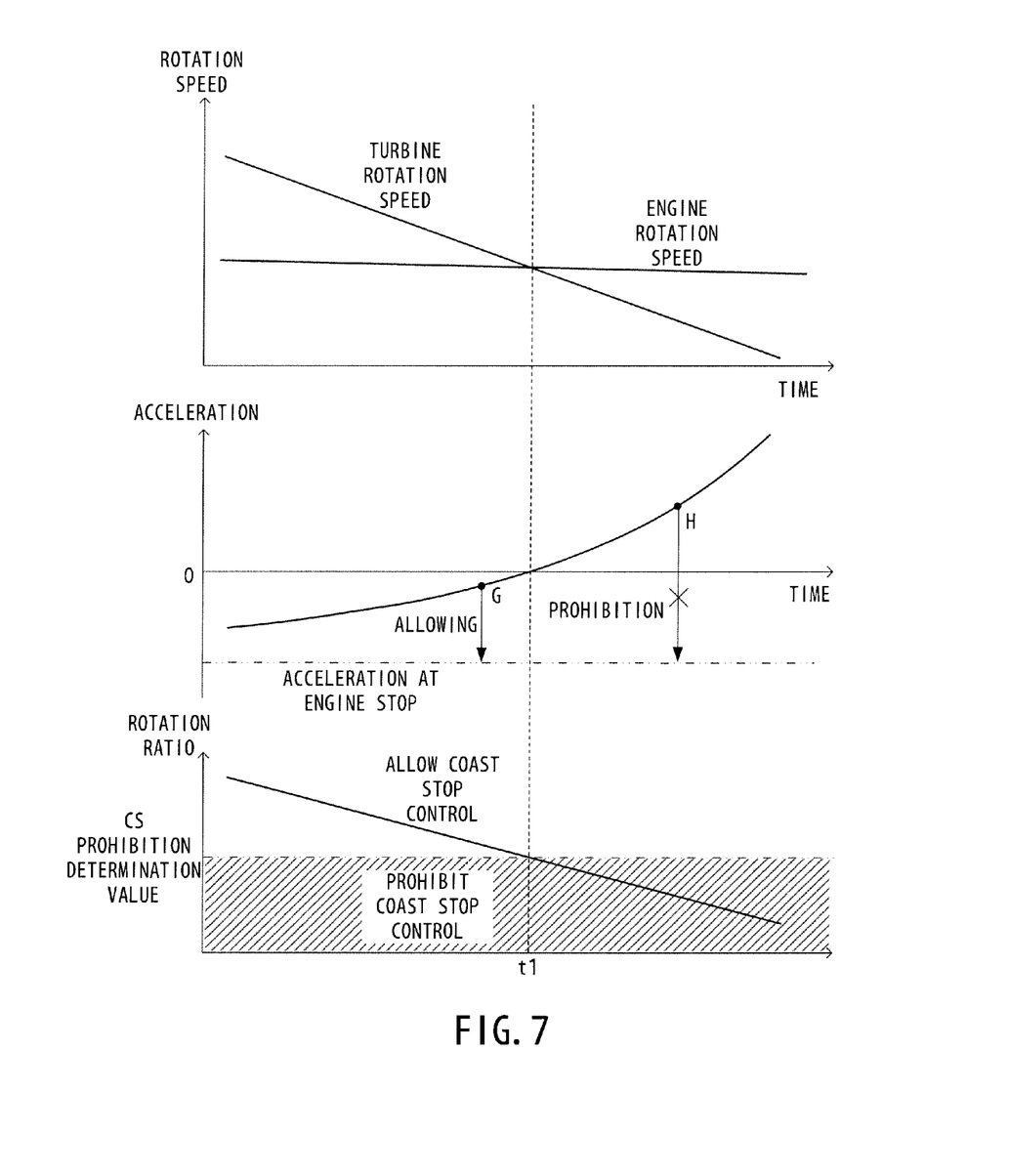
FIG. 7 is a time chart for explaining a case in which the coast stop control is prohibited.

That is, in the above-described control, as illustrated in FIG. 7, even if the coast stop conditions are met, if the rotation ratio is lower than the CS prohibition determination value, the coast stop control is prohibited. As a result, occurrence of a shock at automatic stop of the engine by the coast stop control is prevented.

Here, start of the coast stop control is determined on the basis of the above-described coast stop conditions a to d, for example, and thus, the vehicle speed when the coast stop control is started is different depending on the timing when the conditions are met. For example, if the coast stop conditions are met by depressing the brake pedal (the condition b is met) after the vehicle speed becomes the predetermined low vehicle speed or less (the condition c is met), the vehicle speed when the coast stop control is started is different depending on the timing when the brake pedal is depressed (the condition b is met).

If the vehicle speed when the brake pedal is depressed is the predetermined low vehicle speed or less and is relatively high vehicle speed, the coast stop control is started at a stage earlier than the time t1 in FIG. 7 (left side in FIG. 7), while if the vehicle speed when the brake pedal is depressed is the predetermined low vehicle speed or less and is relatively low vehicle speed, the coast stop control is started at a stage later than the time t1 in FIG. 7 (right side in FIG. 7).

That is, the coast stop control can be started in an OK region (earlier than t1) of the shock or the coast stop control can be started in an NG region (later than t1) of the shock. Considering these points, by prohibiting the coast stop control in the shock NG region in this embodiment, occurrence of a shock caused by execution of the coast stop control is prevented.

Also, if the vehicle is stopped in a state in which the coast stop control is prohibited at Step S13, the automatic stop of the engine is allowed after the stop. That is because a change in acceleration (shock) accompanying the engine stop rarely occurs after the vehicle is stopped. In other words, the automatic stop of the engine 1 is delayed until the vehicle is stopped. As a result, even if the automatic stop of the engine 1 is prohibited during the travel of the vehicle, drop in fuel consumption can be suppressed by stopping the engine after the car is stopped.

As described above, in this embodiment, if the coast stop conditions are met and it is determined that a change amount of acceleration of the vehicle is such a value that has the driver feel a shock, the automatic stop of the engine 1 by the coast stop control is prohibited, and thus, occurrence of a shock by execution of the coast stop control can be prevented, and thus, the driver can be prevented from feeling a shock.

Also, if the rotation ratio of the torque converter 2 is smaller than the CS prohibition determination value, the coast stop control is prohibited. As a result, whether a shock to such a degree that a driver feels the shock will occur or not by the execution of the coast stop control and automatic stop of the engine 1 can be easily determined.

The embodiment of the present invention has been described, but the above-described embodiment merely illustrates an application example of the present invention and does not intend to limit the technical scope of the present invention to a specific configuration of the embodiment. Various changes are possible within a range not departing from the gist of the present invention.

For example, the CS prohibition determination value used in determination at Step S12 may be set to "1". In this case, in the case of the rotation ratio<1, the coast stop control is prohibited since the deviation of the capacity coefficient is large (shock NG), while in the case of the rotation ratio≥1, the coast stop control is allowed since the deviation of the capacity coefficient is small (shock OK). As a result, if the change in the acceleration caused by the engine stop is small as at the point G in FIG. 7, fuel consumption can be suppressed by executing the coast stop control, while if the change in the acceleration caused by the engine stop is large, occurrence of a shock can be prevented by prohibiting the coast stop control.

Also, in the case of rotation ratio<1, it is in the drive state in which the torque is transmitted from the engine 1 to the driving wheels 7, while in the case of the rotation ratio≥1, it is in the driven state in which the torque is transmitted from the driving wheels 7 to the engine 1. That is, the transmission direction of the torque is switched at the rotation ratio "1" as a boundary. At this time, a contact surface between each gear disposed on the driving force transmission path is changed, whereby a shock is caused. Thus, a shock caused by a change in a tooth contact surface can be also prevented by preventing the coast stop control if the rotation ratio is lower than "1", in addition to the shock caused by a change in the driving force.

Moreover, instead of the determination at Step S12, it may be determined whether a detected value of the torque sensor 48 is larger than a predetermined driving force or not. In this case, the predetermined driving force is a value to such a degree that can be determined to make the driver feel a shock by fluctuation in acceleration if the coast stop control is executed. As a result, if the detected value of the torque sensor 48 is determined to be larger than the predetermined driving force, the coast stop control is prohibited, and a shock caused by fluctuation in acceleration can be prevented.

Moreover, it may be determined whether the detected value of the torque sensor 48 is positive (a state in which the torque is transmitted from the engine 1 to the driving wheels 7) or not. If the detected value of the torque sensor 48 is positive, it is in the drive state, while if the value is negative (a state in which the torque is transmitted from the driving wheels 7 to the engine 1), it is in the driven state. Therefore, if the detected value of the torque sensor 48 is determined to be positive, by prohibiting the coast stop control, a shock caused by a change in the tooth contact surface can be prevented, in addition to the shock caused by a change in the driving force.

As described above, in the configuration in which prohibition of the coast stop control is determined on the basis of the detected value of the torque sensor 48, the torque converter 2 is not indispensable. For example, in an operation state in which the above-described coast stop conditions c and d are met, if the accelerator pedal is depressed, the coast stop control is not allowed. Here, in an operation state in which, immediately after the accelerator pedal is released, the brake pedal is depressed, since all the conditions a to d are met, the coast stop control is allowed. Before the conditions a to d are met, the accelerator pedal has been depressed, and thus, the change amount of acceleration is large due to the execution of the coast stop control, and a shock occurs.

However, in the above configuration, in an operation state in which, after the accelerator pedal is released, the brake pedal is depressed immediately, since the condition that the driving force is larger than the predetermined driving force or the driving force is transmitted from the engine 1 to the driving wheels 7 is met, the coast stop control is prohibited, and a shock can be suppressed.

Moreover, in FIG. 1, the torque sensor 48 is disposed on a drive shaft but the torque sensor may be disposed at any other position as long as it is on the driving force transmission path.

Moreover, in this embodiment, the torque converter 2 with a lock-up clutch was described as an example, but it may be a torque converter without a lock-up clutch.

Moreover, in this embodiment, the configuration in which, in order to determine whether the change amount of acceleration of the vehicle is a value to such a degree that makes a driver feel a shock, the controller 12 calculates a rotation ratio and determines whether the calculated rotation ratio is smaller than the CS prohibition determination value or not, and if the rotation ratio is smaller than the CS prohibition determination value, the coast stop control is prohibited is described as an example, but instead, a condition in which "a change amount of acceleration of the vehicle is predetermined acceleration to such a degree that makes a driver feel a shock or less" may be added as the coast stop condition.

As a result, since the coast stop control is not executed if the change amount of acceleration of a vehicle is large, occurrence of a shock caused by execution of the coast stop control can be prevented, and the driver is prevented from feeling a shock similarly to this embodiment.

This application claims priority from Japanese Patent Application No. 2010-266830, filed Nov. 30, 2010, which is incorporated herein by reference in its entirety.

What is claimed is:

1. A controller of a vehicle, comprising a coast stop control unit which automatically stops an engine during the travel of a vehicle when coast stop conditions are met during the travel of the vehicle, wherein
the coast stop control unit automatically stops the engine at least if a change amount of acceleration of the vehicle caused by the automatic stop of the engine is predetermined acceleration or less.

2. The controller of a vehicle according to claim 1, further comprising:
an acceleration determining means unit determines whether the change amount of the acceleration of the vehicle caused by the automatic stop of the engine becomes larger than the predetermined acceleration when the coast stop conditions are met; and
a coast stop control prohibiting unit which prohibits the automatic stop of the engine by the coast stop control unit if it is determined that the change amount of the acceleration of the vehicle becomes larger than the predetermined acceleration.

3. The controller of a vehicle according to claim 2, further comprising:
a fluid transmitting device which is interposed between the engine and driving wheels and transmits a driving force of the engine to the driving wheels, wherein
the acceleration determining unit determines that the change amount of the acceleration of the vehicle becomes larger than the predetermined acceleration if a rotation ratio of the fluid transmitting device is smaller than a predetermined rotation ratio.

4. The controller of a vehicle according to claim 2, further comprising:
a driving force detecting means which detects a driving force to be transmitted from the engine to driving wheels, wherein
the acceleration determining means determines that the change amount of the acceleration of the vehicle becomes larger than the predetermined acceleration if the detected driving force is larger than the predetermined driving force.

5. The controller of a vehicle according to claim 2, further comprising:
a driving force detecting unit which detects a driving force to be transmitted from the engine to driving wheels, wherein
the acceleration determining unit determines that the change amount of the acceleration of the vehicle becomes larger than the predetermined acceleration if the detected driving force is in a state to be transmitted from the engine to the driving wheels.

6. The controller of a vehicle according to claim 1, further comprising:
a fluid transmitting device which is interposed between the engine and driving wheels and transmits a driving force of the engine to the driving wheels, wherein
the coast stop control unit automatically stops the engine if a rotation ratio of the fluid transmitting device is a predetermined rotation ratio or more.

7. The controller of a vehicle according to claim 1, further comprising:
a driving force detecting unit which detects a driving force to be transmitted from the engine to driving wheels, wherein
the coast stop control unit automatically stops the engine if the driving force detected by the driving force detecting unit is a predetermined driving force or less.

8. The controller of a vehicle according to claim 1, further comprising:
a driving force detecting unit which detects a driving force to be transmitted from the engine to driving wheels, wherein the coast stop control unit automatically stops the engine if the driving force detected by the driving force detecting unit is in a state to be transmitted from the driving wheels to the engine.

9. A controller of a vehicle according to claim 3, wherein the predetermined rotation ratio is 1.

10. A controller of a vehicle according to claim 6, wherein the predetermined rotation ratio is 1.

11. A control method of a vehicle, the control method comprising automatically stopping an engine during the travel of a vehicle if coast stop conditions are met during the travel of the vehicle, wherein
the engine is automatically stopped at least if a change amount of acceleration of the vehicle caused by the automatic stop of the engine is predetermined acceleration or less.

12. A controller of a vehicle, comprising coast stop control means for automatically stopping an engine during the travel of a vehicle when coast stop conditions are met during the travel of the vehicle, wherein
the coast stop control means automatically stops the engine at least if a change amount of acceleration of the vehicle caused by the automatic stop of the engine is predetermined acceleration or less.

* * * * *